J. D. OGDEN.
COTTON CHOPPER.
APPLICATION FILED APR. 15, 1919.
1,328,638.
Patented Jan. 20, 1920.
2 SHEETS—SHEET 2.
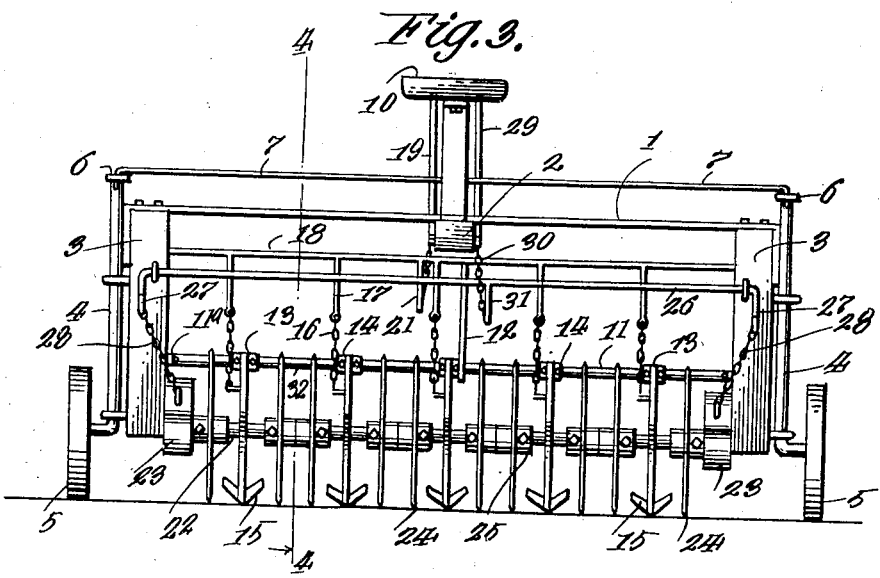
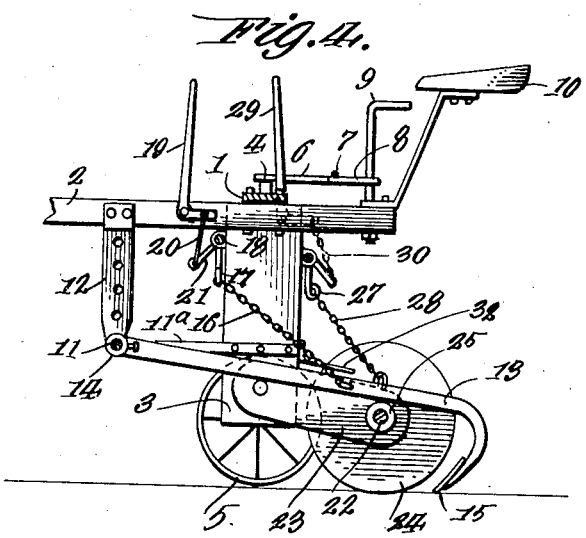
WITNESSES
Guy M. Spring
U. B. Hillyard
Inventor
James D. Ogden
By Richard B. Owen
Attorney

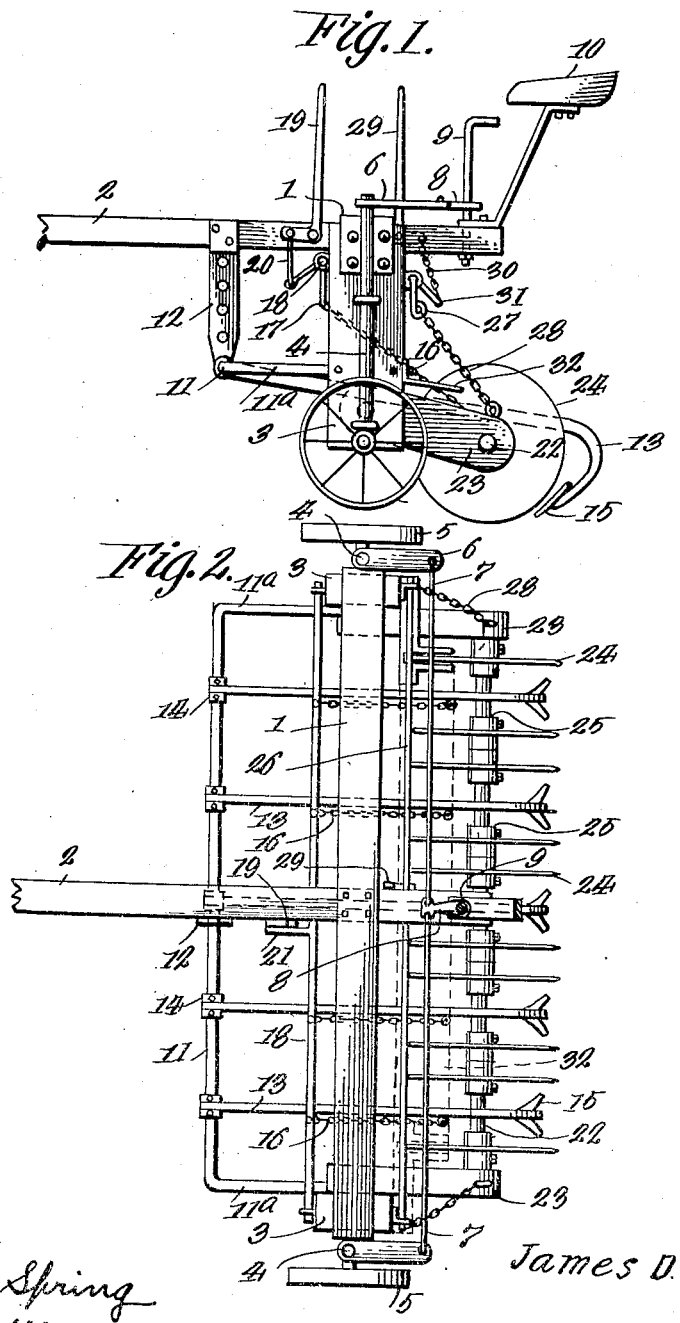

UNITED STATES PATENT OFFICE.

JAMES D. OGDEN, OF CRAWFORD, TEXAS.

COTTON-CHOPPER.

1,328,638.  Specification of Letters Patent.  Patented Jan. 20, 1920.

Application filed April 15, 1919. Serial No. 290,195.

*To all whom it may concern:*

Be it known that I, JAMES D. OGDEN, a citizen of the United States, residing at Crawford, in the county of McLennan and State of Texas, have invented certain new and useful Improvements in Cotton-Choppers, of which the following is a specification.

The invention relates to agricultural implements and more particularly to machines for thinning rows of cotton, whereby to prevent crowding of the plants and insuring a stocky growth which will under favorable conditions produce a good crop.

The invention aims to provide an implement of the character stated which embodies a small number of parts and which is at all times under control of the operator to admit of the chopping mechanism being instantly and quickly adjusted both laterally and vertically as occasion may require, the implement also being of such structural formation as to be readily guided independently of the team, thereby insuring straight rows and providing for a quick turn or a lateral movement as may be required.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

The accompanying drawings illustrate a preferred embodiment of the invention, in which—

Figure 1 is a side view of the cotton chopper.

Fig. 2 is a top view.

Fig. 3 is a rear view, and

Fig. 4 a section on the line 4—4 of Fig. 3 looking to the right.

Corresponding and like parts are referred to in the following description and indicated in the several views of the drawings by like reference characters.

The main frame comprises a transverse beam 1, a longitudinal beam 2 which constitutes a pole or tongue to which the team for drawing the implement is adapted to be hitched and standards 3 depending from the ends of the transverse beam 1. Posts 4 are journaled in bearings on the standards 3 and their lower ends are bent outwardly to form arms which receive ground wheels 5. Arms 6 project rearwardly from the upper ends of the posts 4 and are connected by links 7 to an arm 8 extending forwardly from a steering post 9 mounted upon the rear portion of the longitudinal beam 2 and extending within convenient reach of the driver's seat 10. In this manner the machine may be properly steered by manipulating the steering post 9 in a manner well understood.

A rod or bar 11 is disposed forwardly of the transverse beam 1 in a lower plane and parallel therewith and has its ends 11ª bent rearwardly and secured to the standards 3. A standard 12 is secured at its upper end to the beam 2 and depends therefrom and supports the rod or bar 11 intermediate of its ends. A plurality of beams 13 is mounted on the rod or bar 11 and confined between pairs of set collars 14. The rear ends of the beams 13 curve downwardly and are provided with blades 15 which may be of any construction according to the particular work for which the machine is designed. The rear ends of the beams 13 are movable vertically and each is connected by means of a chain 16 or other means to an arm 17 depending from a shaft 18 which is journaled in bearings applied to the standards 3. A lever 19 mounted on the beam 2 is connected by means of a link 20 to an arm 21 projecting from the shaft 18. Manipulation of the lever 19 effects a rocking of the shaft 18 and a vertical movement of the beams 13 at their rear ends, whereby the blades 15 may be raised or lowered as required.

A transverse shaft 22 is journaled in arms 23 which are pivotally connected at their forward ends to the standards 3. Disk colters 24 are secured to the shaft 22 or mounted thereon in any manner and are retained in the adjusted position by means of set collars 25. The colters 24 are spaced apart the required distance according to the desired stand of cotton so that the rows may be properly thinned. As shown most clearly in Figs. 2 and 3 the disk colters are arranged in pairs, the colters of each pair being spaced apart a distance corresponding with the spaces to be provided between the plants to be left standing. Each pair of disk colters is arranged so that a blade 15 operates between the cuts formed thereby so as to remove the plants. The spaces between the pairs of colters correspond to the plants to be left standing and are usually narrow, whereas the thinning spaces between the colters of each pair are relatively wide. The shaft 22 and the disk colters thereon constitute the cutting mechanism, whereas the beams 13 and blades 15 constitute the thinning mechanism. The cutting mechanism is adjustable vertically and this is accomplished by means of a rod or bar 26 which is mounted in bearings applied to the standards 3 and has its ends bent to provide arms 27 which are connected by chains 28 to the arms 23. A lever 29 mounted on the beam 2 is connected by means of a chain 30 to an arm 31 projecting from the rod or bar 26, thereby admitting of the cutting mechanism being raised or lowered as required. A plate 32 is secured to the standards 3 and extends rearwardly and is formed with cuts to receive the disk colters 24. This plate acts as a cleaner to strip trash and other matter from the colters 24 so as to keep the same clean and in working condition.

The foregoing description and the drawings have reference to what may be considered the preferred, or approved form of my invention. It is to be understood that I may make such changes in construction and arrangement and combination of parts, materials, dimensions, etc., as may prove expedient and fall within the scope of the appended claims.

Having thus fully described my invention, what I claim as new and desire to secure by Letters Patent is:—

1. A cotton chopper, comprising a main frame having depending standards, a rod disposed forwardly of the standards and having its ends bent rearwardly and secured thereto, beams pivotally mounted upon the rod and provided at their rear ends with shovel blades, arms pivoted to the standards, a shaft mounted in the pivoted arms, disk colters on the shaft arranged in pairs, the colters of each pair coöperating with a shovel blade whose beam passes therebetween, rods mounted on the standards and having offstanding arms which are connected with the said beams and pivoted arms, respectively, and a lever connected with each of the rods to admit of independent adjustment of the beams and colters.

2. A cotton chopper, comprising a main frame including longitudinal and transverse beams and depending standards at the ends of the transverse beam, cutting and thinning mechanisms connected to the said depending standards, a rod journaled forwardly of the standards and having offstanding arms connected to the thinning mechanism, a second rod journaled in the rear of the depending standards and connected to the cutting mechanism and operating levers for the respective rods.

3. A cotton chopper, comprising longitudinal and transverse beams, the latter having depending standards at its ends, vertical posts journaled to the standards and having their lower ends extending outwardly and provided with ground wheels, a steering post, means connecting the vertical posts to the steering post, a rod disposed forwardly of the standards and having its ends bent rearwardly and secured to the standards, a bar depending from the longitudinal beam and engaging the rod midway of its ends, a plurality of beams pivotally mounted upon the rod and provided at their rear ends with shovel blades, arms pivoted to the depending standards, a shaft mounted in the pivoted arms, pairs of disk colters on the shaft and having the beams passing therebetween with their shovel blades operating in the cuts formed by the colters, rods mounted upon the depending standards and having offstanding arms connected to the pivoted arms and beams, respectively, and levers having connection with the rods to admit of independent vertical adjustment of the disk colters and shovel blades.

In testimony whereof I affix my signature in presence of two witnesses.

JAMES D. OGDEN.

Witnesses:
H. J. GERMANY,
HENRY BURKE.